United States Patent [19]

Furuya

[11] Patent Number: 4,977,456
[45] Date of Patent: Dec. 11, 1990

[54] LIQUID CRYSTAL VIEWFINDER

[75] Inventor: Yoshikiyo Furuya, Suwa, Japan

[73] Assignee: Seiko Epson Corporation, Tokyo, Japan

[21] Appl. No.: 479,192

[22] Filed: Feb. 13, 1990

Related U.S. Application Data

[63] Continuation of Ser. No. 159,457, Feb. 18, 1988, abandoned, which is a continuation of Ser. No. 870,263, Jun. 3, 1986, abandoned.

[30] Foreign Application Priority Data

Jun. 4, 1985 [JP] Japan ................................ 60-120772
Feb. 20, 1986 [JP] Japan ................................ 61-35733

[51] Int. Cl.⁵ ......................... H04N 5/30; H04N 5/232
[52] U.S. Cl. ................................. 358/213.13; 358/224
[58] Field of Search ............. 358/224, 213.11, 213.13, 358/236, 241, 209, 59, 60

[56] References Cited

U.S. PATENT DOCUMENTS

| | | | |
|---|---|---|---|
| 4,294,524 | 10/1981 | Stolov | 358/60 |
| 4,303,322 | 12/1981 | Someya | 358/224 |
| 4,330,797 | 5/1982 | Yokokawa | 358/224 |
| 4,403,216 | 9/1983 | Yokoi | 358/236 |
| 4,571,268 | 2/1986 | Thornton | 358/224 |
| 4,571,627 | 2/1986 | Stempeck | 358/224 |
| 4,692,006 | 9/1987 | Rice | 358/224 |

FOREIGN PATENT DOCUMENTS

| | | | |
|---|---|---|---|
| 109080 | 8/1980 | Japan | 358/224 |
| 177774 | 9/1985 | Japan | 358/224 |

*Primary Examiner*—Tommy P. Chin
*Attorney, Agent, or Firm*—Blum Kaplan

[57] ABSTRACT

An electronic viewfinder for displaying video images captured in an attached electronic camera utilizes a liquid crystal display which can be illuminated from the rear by ambient illumination or by light from an included fluorescent lamp. The liquid crystal display is positioned at a slight angle to the viewer's line of sight and light transmitted by the display is diffused thereafter to provide a high quality image.

27 Claims, 6 Drawing Sheets

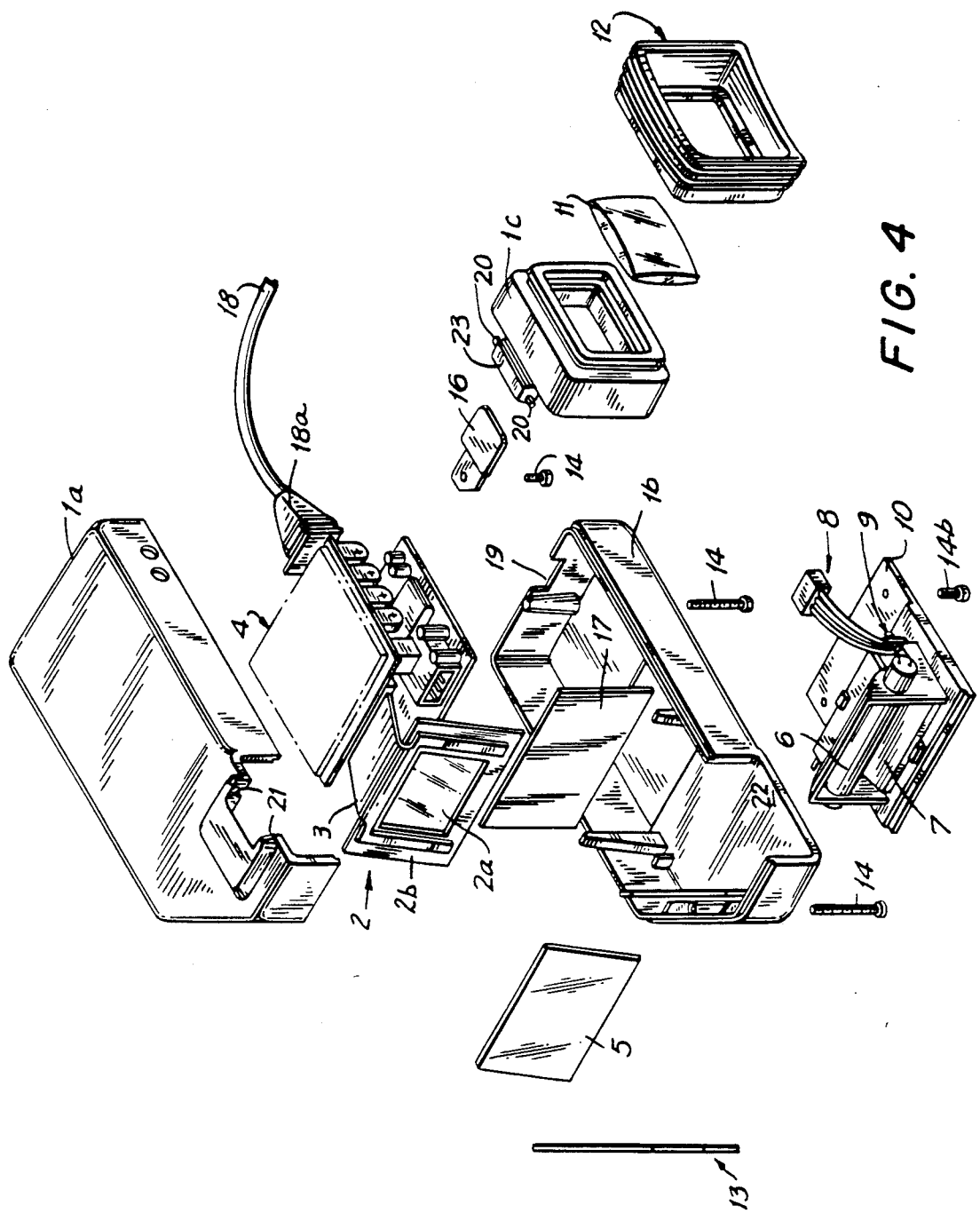

LIQUID CRYSTAL VIEWFINDER

This is a continuation of application Ser. No. 07/159,457, filed Feb. 18, 1988, now abandoned, which is a continuation of application Ser. No. 06/870/263, filed June 3, 1986, now abandoned.

BACKGROUND OF THE INVENTION

The present invention relates to viewfinders for use in video cameras and the like. More particularly, the invention relates to a viewfinder in which a liquid crystal display panel reproduces the image which is being captured by a video camera.

In conventional video cameras, an electronic display of the scene which is being captured by the camera is produced on the screen of a Braun tube (cathode ray picture tube) as the image display. In such viewfinders, a large amount of space is required for the Braun tube itself and for the extra-high-voltage circuit which powers it. The resulting viewfinder structure is large and bulky, and is poorly matched with the structure of the video camera. Further, the Braun tube and its high voltage supply require a considerable amount of electric power.

While attempts have been made to utilize a liquid crystal display panel in place of the Braun tube because the liquid crystal display panel is compact and because it consumes less power, the display which resulted was crude because of the coarseness of the picture elements. As a result, the potential of the liquid crystal display in a viewfinder has never been realized.

SUMMARY OF THE INVENTION

The electronic viewfinder of the invention utilizes a liquid crystal display panel which is placed at an angle of slightly less than 90° relative to the line of sight between the eye of the viewer and the front of the display panel. The rear of the display panel is illuminated with light from a fluorescent lamp which is distributed thereon by means of a reflector or a light guide.

A diffusing surface which can be carried on a transparent plate which is placed in front of the display panel or on the front surface of the display panel, receives light which passes through the liquid crystal display panel when the elements of the panel are driven by video signals from a driver circuit. The diffusing surface may be of ground glass or it may be of glass or a transparent plastic which is optically molded to provide the desired diffusing effect.

In one embodiment of the invention, provision is made in the housing of the viewfinder to admit light which is directed by a reflecting surface on to the rear of the liquid crystal display panel, in lieu of light from the fluorescent tube. When the level of the ambient light is sufficient, operation of the fluorescent tube can be dispensed with so that battery life is conserved.

It is an object of the invention to provide an image display device for use with video cameras and the like which is compact and requires little electric power.

It is another object of the invention to provide an electronic viewfinder having a liquid crystal display panel which can be viewed directly, or indirectly by means of a mirror, and in which the image provided by the electrical circuitry can be reversed by reversing the liquid crystal display panel without need to change circuit connections.

Still another object of the invention is to provide an electronic viewfinder having a liquid crystal display panel in which the quality of the reproduced image is improved by slanting the panel relative to the angle of viewing.

A further object of the invention is to provide an electronic viewfinder having a liquid crystal display panel in which the reproduced image is improved by means of a light diffuser placed between the viewer and the liquid crystal display panel.

Still a further object of the invention is to eliminate the need for a parting plate between the viewer and the viewed image in an electronic viewfinder.

A still further object of the invention is to provide an electronic viewfinder which can be serviced easily.

It is still another object of the invention to provide an electronic viewfinder in which power is conserved by utilizing ambient lighting.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description, taken in connection with the accompanying drawings in which:

FIG. 4 is an exploded view showing the components of the liquid crystal viewfinder of FIGS. 1, 2, and 3;

DETAILED DESCRIPTION OF THE INVENTION

Figure 1:
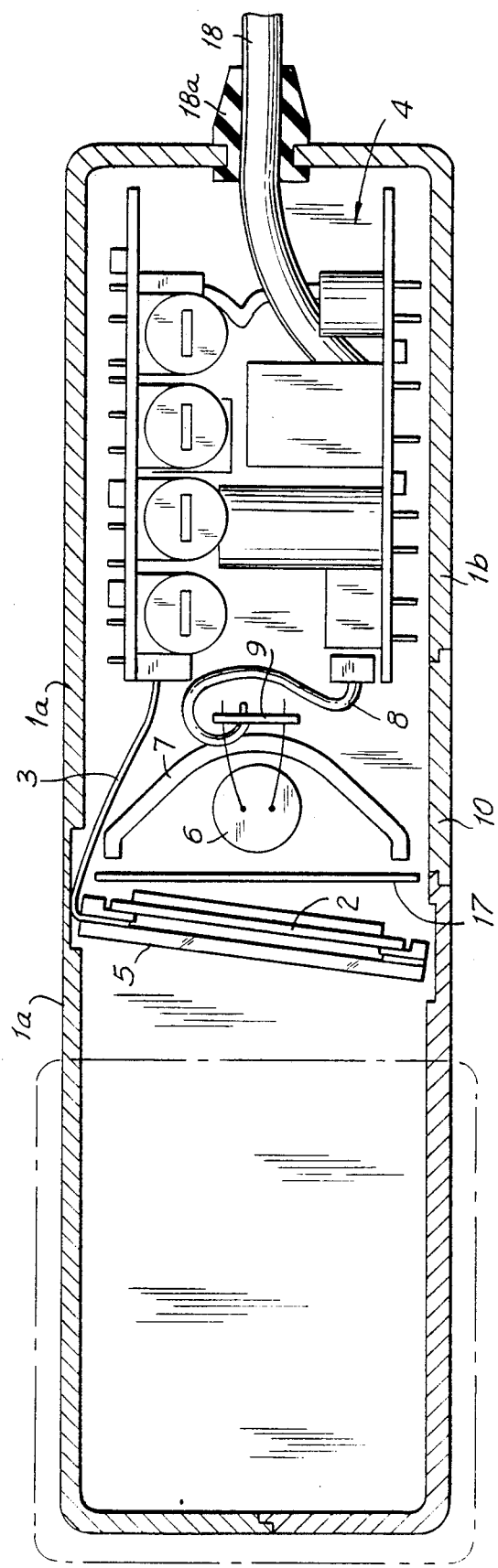
FIG. 1 is a side elevational sectional view of a liquid crystal viewfinder fabricated in accordance with the teachings of the inventions.
Figure 2:
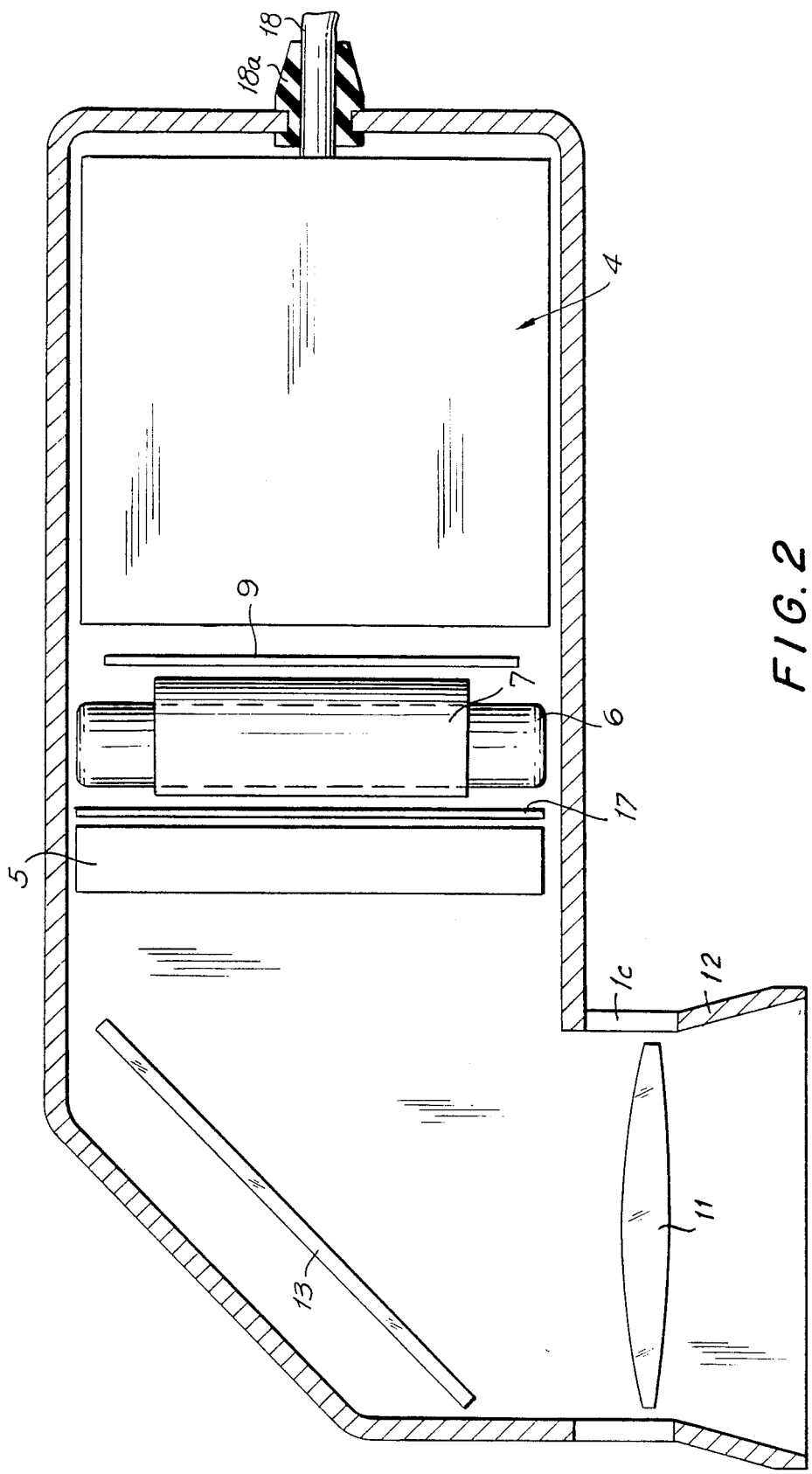
FIG. 2 is a top plan sectional above of the liquid crystal viewfinder of FIG. 1.
Figure 3:
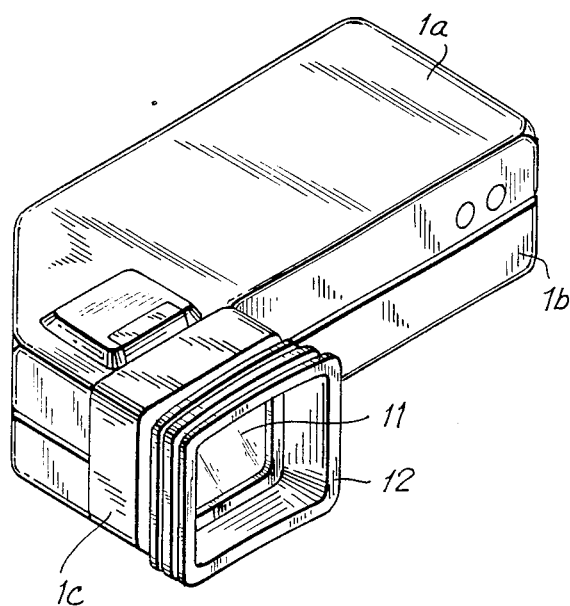
FIG. 3 is a perspective view of the liquid crystal viewfinder of FIGS. 1 and 2.

Reference is first made to FIGS. 1-4 which depict an embodiment of an electronic viewfinder which embodies the principles of the invention. The assembled viewfinder can best be seen in FIG. 3, where the upper and lower cases 1*a* and 1*b*, respectively, support an ocular case portion 1*c* which contains a viewing lens 11. An eye cup 12, fastened around lens 11 on ocular case portion 1*c*, excludes light from the viewer's eye when it is positioned close to the ocular lens in the conventional manner. As depicted in FIGS. 1-4, cases 1*a* and 1*b* protect the viewfinder as well as accommodating it.

Located within cases 1*a* and 1*b* (FIGS. 1, 2 and 4) is a liquid crystal assembly 2 on which the image received within the associated camera is displayed. Liquid crystal assembly 2 includes a liquid crystal display panel 2*a* having a front surface and a rear surface and an associated circuit board 2*b* (FIG. 4). Liquid crystal assembly 2 is connected by means of a detachable connector 3 to main electric circuit assembly 4, thus facilitating disassembly, assembly, and/or replacement during servicing. A cover-glass 5 is placed immediately in front of liquid crystal display assembly 2, (i.e. facing the front surface of panel 2a) e.g., between the eye of the viewer and display panel 2a. Cover glass 5 protects the liquid crystal display panel against the accumulation of dust.

Spaced-apart and to the rear of liquid crystal display panel 2a (i.e. facing and positioned substantially perpendicularly to the rear surface of panel 2a) is a tubular fluorescent lamp 6 which is mounted in a reflector 7. Reflector 7 concentrates the light from fluorescent lamp 6 via a diffusing-plate 17 onto the rear of display panel 2a in a substantially uniform fashion. The assembly of fluorescent lamp 6, reflector 7, board 9, and a detachable connector 8, comprise a unit which is mounted on a removable lamp cover 10. Lamp cover 10 forms part of the case when held in place by a pair of screws 14b (only one of which is shown in FIG. 4). Signals for forming an image on display panel 2a are fed into circuit assembly 4 via an input cable 18 which includes a specially configured connector 18a (formed with a circumferential groove 18b) which, being closely fitted on cable 18 and positioned in the interface between upper and lower cases 1a and 1b, serves to prevent motion of cable 18. The entire arrangement provides for convenient removal of the fluorescent lamp assembly when replacement of the fluorescent lamp is required.

The optical portion of the viewfinder of the illustrative embodiment of FIGS. 1–4 includes liquid crystal display panel 2a, liquid crystal display panel cover-glass 5, a mirror 13, and viewing lens 11. Viewing lens 11 corrects and/or adjusts the focal distance between the eye the liquid crystal display and provides appropriate focused magnification of the viewfinder image. Eye cup 12 performs the usual function of preventing extraneous light from reducing the bright viewfinder image. Mirror 13 shifts the viewing axis of the display image by about 90 degrees, so that the image on liquid crystal display panel 2a is not viewed from the front, but rather is viewed from one side of the assembly. Ocular case portion 1c is pivotally suspended on pinions 20 which are seated in recesses 21 in cover 1a. The lens assembly including ocular case 1c, viewing lens 11, and eye cup 12, can thus be swung outwards and upwards away from the opening 22 in the side of the case above which pinions 20 are supported. In this way, a direct view of mirror 13 and, hence, of liquid crystal display panel 2a, reflected therein, can be obtained. A leaf-spring 16 holds pinions 20 in recesses 21 and cooperates with the irregular shape of pinion support 23 to maintain the viewing lens assembly in the normal viewing position or in the direct viewing position.

It is a feature of the invention that the liquid crystal display panel is slanted at a slight angle away from the perpendicular, relative to the line of sight between the viewer and the panel. As will be seen below, this viewing angle, when combined with the use of diffuse backlighting of the liquid crystal display panel, results in optimum viewing of a smooth, clear, reproduced image without introducing undesirable angularity into the picture elements. An image of high portrait quality is produced by installation of the liquid crystal display panel at the slight angle since the liquid crystal display panel characteristically is seen more clearly when viewed obliquely. The direction of slanting of the liquid crystal display panel will, of course, require adjustment in cases where the angle of viewing the panel is different from the one shown in FIGS. 1–4.

Still another factor which contributes to the production of a smooth image results from the provision of a rough or uneven, light-diffusing surface on cover-glass 5 onto which the angular picture element pattern reproduced by the liquid crystal display panel is projected. Since the quality of the image fades off completely when the distance between the cover-glass and the liquid crystal display panel is made too large, the spacing therebetween should be less than approximately 5 mm. Also, it will be apparent to those skilled in the art that the light-diffusing surface can also be formed on a glass panel which constitutes an element of liquid crystal display panel 2a, instead of the cover-glass.

It is to be noted that, instead of masking which is directly applied to the liquid crystal display panel, the effect of masking can be produced by suitably marking the cover-glass 5. Thus, for example, reticles, frames, and the like, can be produced on one surface of the cover glass by printing.

Figure 5A:
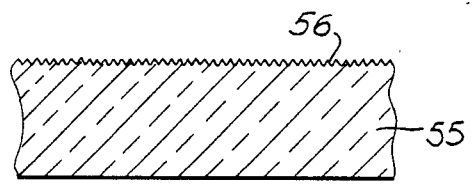
FIGS. 5(*a*), 5(*b*), 5(*c*), and 5(*d*) are sectional views of diffusing plates useful in the viewfinder of the invention.
Figure 5B:
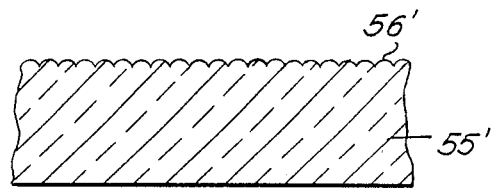
Figure 5C:
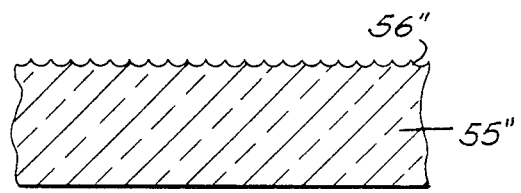
Figure 5D:
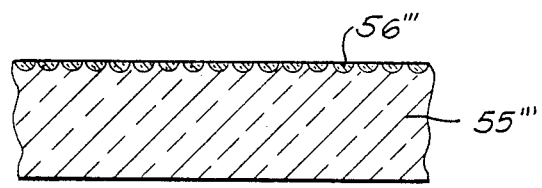

The light-diffusing surface may take a number of forms, some of which are shown in FIGS. 5(a) to 5(d). In FIG. 5(a), a simple, finely uneven surface 56 is formed on a glass plate 55, for example, by etching or grinding. In FIG. 5(b), a surface 56' on a glass plate 55' consists of a plurality of fine convex projection lenses having uniform curves. The lenses are, for example, molded into the surface of the plate. In FIG. 5(c), concave lenses on a surface 56'' are molded concavities in the surface of a plate 55''. FIG. 5(d) illustrates a light-diffusing member which is formed of materials having two different indices of refraction. In the diffusing member of FIG. 5(d), an array of elements of one material having a first index of refraction is set in the concavities in a surface 56''' of a substrate plate 55''' which is made of a material which has a second index of refraction. Since there is a difference in the refractive index between the elements which are set into surface 56''' and base plate 55''', light passing through both is refracted, and thereby microscopically diffused.

The various light-diffusing surfaces of FIGS. 5(a)–5(c) can be produced by well-known means, including grinding, honing, molding, or transfer processes employing etching, etc., so as to produce the requisite surface for diffusing the light. The light-diffusing surface 56''' (FIG. 5(d)) can be produced, for example, by dipping the base material for partial ion exchange to convert it into a material having a different refractive index.

It is to be understood that, since the object of the light-diffusing surface is to produce a projected image of the picture element which is produced on the liquid crystal display panel, the pitch, i.e., the un-evenness in the light-diffusing surface, must be less than the pitch of the image-forming elements of the liquid crystal display panel. The finely divided ground glass surface of FIG. 5(a) meets this requirement easily. However, since the arrays of 5(b), 5(c), and 5(d), diffuse light in a more discrete manner, the requisite uniform diffusion can be produced on a picture element basis by arranging for the arrays of the diffusing elements to have the same pitch as the picture elements. In this way a uniformly smooth and clear reproduced image is seen in which the angularity of the picture elements is smoothed out.

Figure 6:
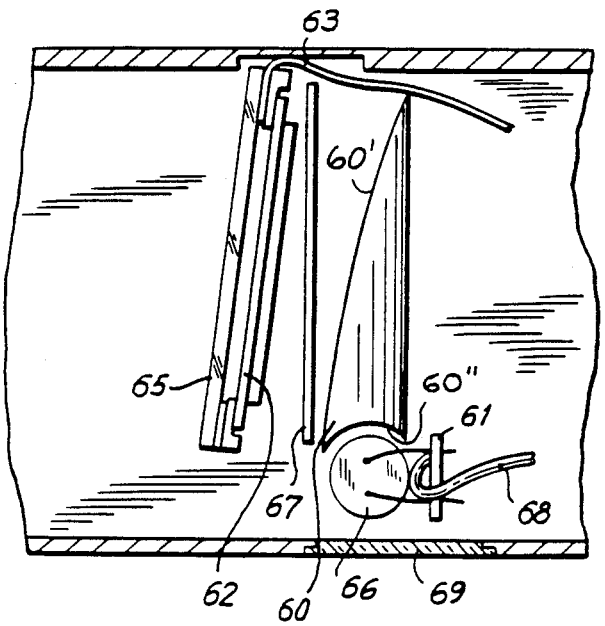
FIG. 6 illustrates the use of a light guiding plate for illuminating the liquid crystal display of the invention.

Another embodiment of the invention is shown in FIG. 6 where fluorescent lamp 66 is placed obliquely to one side of a liquid crystal display panel 62, instead of directly behind the panel as in the first embodiment. Thus, fluorescent lamp 66, a fluorescent lamp circuit board 61, and a fluorescent power supply connector 68 are positioned towards a bottom of the case 70, being supported on a lamp cover 69 by means which are not shown.

Immediately above fluorescent lamp 66 is a generally wedge-shaped light-guide plate 60 which may be made, for example, of plastic. Light-guide plate 60 is shaped with a convex forward surface 60' which lies obliquely to one side of a concave light-receiving surface 60" immediately above lamp 66. Light collected from lamp 66 is redirected in light-guide plate 60 to uniformly illuminate the rear of liquid crystal display panel 62 through a diffusing plate 67. As before, liquid crystal display panel 62 is provided with a cover plate 65 of glass. Signals for controlling the display are introduced by connecting lead 63. While the remainder of the viewfinder of this embodiment is of the same construction as that described above in connection with FIGS. 1-4 it is notable that the structure of FIG. 6 is more longitudinally compact.

Figure 7:
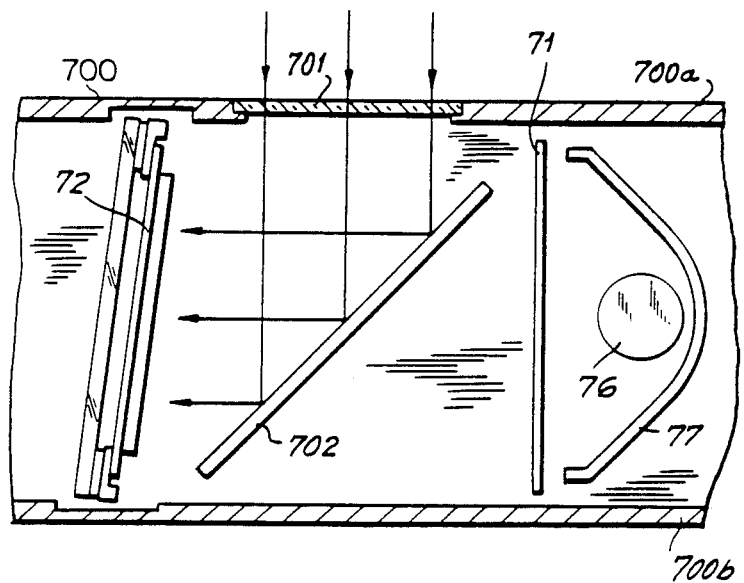
FIG. 7 illustrates an embodiment of the invention in which the liquid crystal display utilizes external light.

Still another embodiment in which light for illuminating the display screen can be external to the viewfinder is depicted in FIG. 7. It has been implicit in the foregoing that liquid crystal display panels do not emit light and that some form of illumination is required in order to view the images which are formed. While an advantage of the liquid crystal display panel in the construction of viewfinders is the low operating power which is required, as compared to the Braun tube, the use of some power is, nevertheless, required when the display is to be illuminated by artificial light. The third embodiment of the invention, therefore, provides for the use of available light, such as sunlight, or ambient room light of sufficient brightness, so as to reduce the use of power. In the embodiment of FIG. 7, provision is made for illuminating liquid crystal display panel 72 from the rear by light which has passed through viewfinder case wall 700a via a diffusing plate 701 which is mounted integrally therein. When the level of ambient light is insufficient, the alternate light source is a fluorescent lamp 76, via a diffusing plate 71, in the manner of the previous embodiments. To this end, a diagonally-disposed, semi-transparent reflecting member 702 is placed on a line directly between fluorescent lamp 76 (and its reflector 77), and the rear of liquid crystal display panel 72. The upper surface of reflecting member 702 is located directly beneath diffusing plate 701. Thus, light originating either at fluorescent lamp 76 or outside of a viewfinder case 700 can be transmitted to liquid crystal display panel 72. When sufficient light is provided via diffusion plate 701, the fluorescent lamp need not be turned on. On the other hand, when the ambient light level is low or when there is none, fluorescent lamp 76 can be lit at times when the viewfinder is in use. Semi-transparent reflector 702 may be replaced by a so-called "magic mirror" which reflects the external light as well as transmitting light from the fluorescent lamp.

It will be apparent to those skilled in the art that the principle of using external light illustrated in FIG. 7 can be employed in other structures in which the external light is taken in onto a movable mirror which can be swung into position when needed, and moved out of the way when use of artificial illumination is required. Further, the arrangement of FIG. 7 can be automated by providing means which determines the level of the external light and which, when sufficient external light is present, will automatically prevent the use of the internal light, thus minimizing the use of power as well as providing added convenience in use.

Advantages which flow from the invention are as follows.

The use of a compact, ultra-thin liquid crystal display panel as the image display in a viewfinder provides a small structure having compact circuitry which consumes little power at relatively low voltages.

Since the liquid crystal display panel is equally useful when viewed from either side, it can be readily reversed physically so that the image can be viewed directly from the front or, via a mirror, from the side, eliminating the need to change the electrical circuitry to reverse the image. Only one crystal display panel is, therefore, required for mass production.

Since some distance is provided between the viewing lens of the viewfinder and the display panel of the invention, the requirement that the panel be slightly slanted, relative to the angle of view, in order to make best use of the characteristics of the display, does not result in uncomfortable viewing due to the need of the eye to accommodate to changes in distance. As a result, the panel can be slanted to improve the quality of the image as viewed. Further, the clarity of the reproduced image is improved by diffusing the light which is projected by the liquid crystal display elements, thereby softening of the pattern produced on the cover glass or the front panel of the display by creating a smooth display image.

By utilizing the cover glass of the liquid crystal display as a masking plate, light leakage can be prevented without the requirement for additional structural elements. The resulting structure is simple, and can be printed readily on the cover-glass.

The use of a long-lived fluorescent lamp results in a viewfinder which can be expected to have long intervals between servicing. Further, the assembly of the fluorescent lamp, its electrical circuit and connectors on a cover-plate which forms a part of the viewfinder case simplifies maintenance activity.

Since the liquid crystal display panel is connected to the driving electrical circuit by connectors, the unit is readily serviceable.

Finally, the invention provides for the saving of power by using external lighting for illumination of the liquid crystal display panel. Thus, when a video tape recorder is being used in daylight, the image on the liquid crystal display panel will be clear. Further, the use of the internal light will rarely be necessary when the lighting window of the viewfinder is oriented to gather light which arrives from the brightest direction.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electronic viewfinder for reproducing an image representative of video signals captured by a video camera used by a viewer, the viewfinder comprising:
   a liquid crystal assembly which includes liquid crystal display panel means responsive to said video signals for reproducing the image, said liquid crystal display panel means having a front surface and a rear surface;
   housing means for enclosing the liquid crystal display panel means;
   artificial illuminating means located within the housing means and directly behind the rear surface of the liquid crystal display panel means, relative to the viewer, for illuminating the liquid crystal display panel means;
   first diffusing means located between the liquid crystal display panel means and artificial illuminating means for controlling the illumination provided by the illuminating means so as to uniformly irradiate the surface of the liquid crystal display panel means facing the illuminating means;
   circuit means coupled to the video camera and the liquid crystal display panel means and including a main electric circuit assembly, said circuit means for supplying the video signals to the liquid crystal panel display means;
   first detachable connector means for detachably coupling the liquid crystal assembly to the main electric circuit assembly; and
   second detachable connector means for detachably coupling said artificial illuminating means to said main electric circuit assembly.

2. The electronic viewfinder of claim 1, and further comprising:
   second diffusing means in the line of sight between the viewfinder and the liquid crystal display panel means onto which said image is projected for viewing when the liquid crystal display panel means is actuated by the video signals, the second diffusing means being located in close proximity to the liquid crystal display panel means to avoid fading-off of the image.

3. The electronic viewfinder of claim 2 wherein the second diffusing means comprises one of a diffusing surface on a transparent plate which is adjacent to the liquid crystal display panel means and a diffusing surface on the face of the liquid crystal display panel means.

4. The electronic viewfinder of claim 2 wherein the second diffusing means comprises one of a ground glass surface, a surface having a multiplicity of convex lenses formed thereon, and a surface having thereon lens-like materials of a different refractive index.

5. The electronic viewfinder of claim 2 wherein the liquid crystal display panel means comprises a plurality of image forming elements which are spaced apart at a uniform pitch, and the second diffusing means comprises lens-like elements which are spaced apart at the same pitch.

6. The electronic viewfinder of claim 1 wherein the artificial illuminating means includes a fluorescent lamp.

7. The electronic viewfinder of claim 6, and further comprising:
   reflecting means adjacent to the fluorescent lamp for redirection light therefrom onto the liquid crystal display panel means.

8. The electronic viewfinder of claim 7, further including removable lamp cover means detachably connected to and for removably positioning the fluorescent lamp and the reflecting means to illuminate the rear surface of the liquid crystal panel display means.

9. The electronic viewfinder of claim 6, and further comprising:
   light guiding means for directing light from the fluorescent lamp onto the rear of the liquid crystal display panel means.

10. The electronic viewfinder of claim 9 wherein the fluorescent lamp is located obliquely to the rear of the liquid crystal display panel means and the light guiding means comprises a transparent body having a convex surface which faces the rear surface of the liquid crystal display panel means for directing light thereto and having a concave surface which is located obliquely relative to the convex surface for collecting light from the fluorescent lamp.

11. The liquid crystal display means of claim 10 and further comprising:
    aperture means in a wall of the housing for admitting ambient light thereto; and
    reflector means disposed in the housing between the fluorescent lamp and the liquid crystal display panel means for directing light from the aperture means to the liquid crystal display panel means.

12. The electronic viewfinder of claim 11 wherein the reflector means is semitransparent.

13. The electronic viewfinder of claim 11 wherein the aperture means comprises a diffusing surface.

14. The electronic viewfinder of claim 9, further including removable lamp cover means detachably connected to the housing means and for removably locating the fluorescent lamp and the light guiding means to illuminate the rear surface of the liquid crystal panel display means.

15. The electronic viewfinder of claim 6, and further comprising:
    means adjacent the liquid crystal display panel means for directing ambient light thereto in lieu of light from the fluorescent lamp.

16. The liquid crystal display of claim 6 and further comprising:
    removable lamp cover means in a wall of the housing means on which the fluorescent lamp is carried for locating the fluorescent lamp at the rear of the liquid crystal display panel means.

17. The electronic viewfinder of claim 1 wherein the artificial illuminating means includes reflector means and further comprising:
    housing means for enclosing the liquid crystal display panel means and the reflector means; and
    aperture means in a wall of the housing means through which ambient light can be directed to the reflector means.

18. The electronic viewfinder of claim 17 wherein the reflector means is semitransparent.

19. The electronic viewfinder of claim 17 wherein the aperture means comprises a diffusing surface.

20. The electronic viewfinder of claim 1, further including semi-transparent reflector means between the liquid crystal display panel means and the artificial illuminating means; and window means in the housing means for receiving light from outside of the housing to illuminate the liquid crystal display panel means, whereby use of power to energize the source of artificial light is minimized.

21. The electronic viewfinder of claim 1, further including removable cover means for removably positioning the artificial illuminating means adjacent to the rear surface of the liquid crystal display panel means.

22. The electronic viewfinder of claim 1, further including masking plate means disposed adjacent to and facing the front surface of the liquid crystal display panel means and for preventing leakage of light from the artificial illuminating means.

23. The electronic viewfinder of claim 22, wherein a cover glass serves as the masking plate means.

24. The electronic viewfinder of claim 1, wherein the artificial illuminating means is disposed substantially perpendicularly to the rear surface of the liquid crystal display panel means.

25. The electronic viewfinder of claim 1, further including removable cover means for removably positioning the artificial illuminating means adjacent to the rear surface of the liquid crystal display panel means.

26. The electronic viewfinder of claim 1, further including masking plate means disposed adjacent to and facing the front surface of the liquid crystal display panel means and for preventing leakage of light from the artificial illuminating means.

27. The electronic viewfinder of claim 1, further including reflecting means for reflecting light from said artificial illuminating means onto the liquid crystal display panel means and located behind said artificial illuminating means relative to the viewer.

* * * * *